Feb. 1, 1944. A. WINTHER Re. 22,432

ELECTRICAL CONTROL APPARATUS

Original Filed May 5, 1941 3 Sheets-Sheet 1

Anthony Winther,
Inventor.
Haynes and Koenig,
Attorneys.

Anthony Winther,
Inventor.
Haynes and Koenig,
Attorneys.

Feb. 1, 1944. A. WINTHER Re. 22,432

ELECTRICAL CONTROL APPARATUS

Original Filed May 5, 1941 3 Sheets-Sheet 3

Anthony Winther,
Inventor.
Haynes and Koenig,
Attorneys.

Reissued Feb. 1, 1944 Re. 22,432

UNITED STATES PATENT OFFICE 22,432

ELECTRICAL CONTROL APPARATUS

Anthony Winther, Kenosha, Wis., assignor to Martin P. Winther, as trustee

Original No. 2,286,778, dated June 16, 1942, Serial No. 391,933, May 5, 1941. Application for reissue August 19, 1942, Serial No. 455,351

19 Claims. (Cl. 172—284)

This invention relates to electrical control apparatus, and with regard to certain more specific features to torque control apparatus for alternating-current motors.

Among the several objects of the invention may be noted the provision of means for setting a limit upon the torque to be delivered from a motor, this torque to be at a determined ratio to full motor torque; the provision of apparatus of this class which, after torque is set, requires no further manual adjustment in order to obtain conditions of minimum time for accelerating a driven machine up to running speed; and the provision of apparatus of the class described which permits of accelerating the driven machine under conditions of complete safety to the driving motor. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a diagram of mechanical apparatus forming part of the invention;

Similar reference characters indicate corresponding parts throughout the several views of the drawings.

It is often of advantage to be able to set and hold at a predetermined ratio of the full load torque of a motor the maximum torque which is applied by that motor, particularly in the case of A. C. motors. This is useful in various applications.

For example, if it is desired to accelerate a centrifuge machine or the like in the least possible time, it is advantageous to be able to set torque at a predetermined safe overload torque for the motor, and to have acceleration take place under uniform conditions of said overload torque from the starting of the operation until completion, without the necessity for further manual adjustment by the operator. This will permit the centrifuge machine to accelerate in the least possible time consistent with safe loading of the motor.

In cases of A. C. motors coupled to their loads through means which maintain a predetermined constant output speed, it is frequently desirable to limit the torque which the motor can apply to machines operating under varying loads, and also to function as a safeguard against extreme overloading when starting.

The invention is also useful to limit or control torque in cases where plastics, glues and the like are stirred where, upon thickening, the load due to stirring might increase to undesirable values so far as the motor is concerned, but where slowing down of the stirring could be tolerated along with limitation of motor torque if there were absolute assurance against complete cessation of movement. The present invention gives this assurance by assuring that the motor cannot be loaded to a stall condition.

Figure 1:
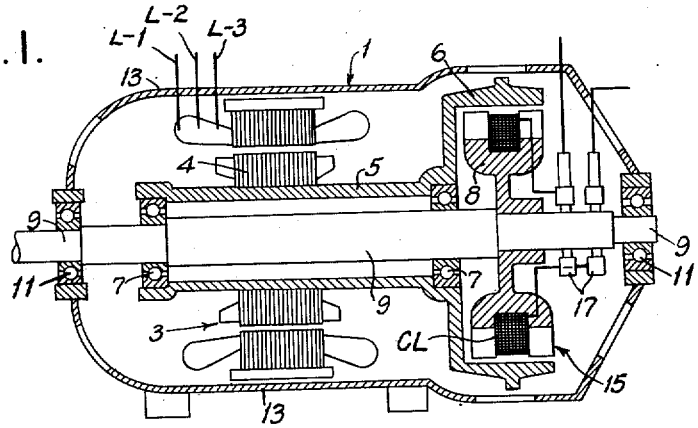

Referring now more particularly to Fig. 1, there is shown at numeral 1 a combination electric motor and an electromagnetic eddy-current slip clutch unit consisting of an A. C. motor element 3, the rotor 4 of which is keyed on a rotary quill 5. This quill 5 is mounted upon bearings 7 which in turn are carried upon a shaft 9. Shaft 9 forms the driven element and is rotary in bearings 11 in a case 13. A variable magnetic slip coupling is maintained between the quill 5 and the shaft 9 by means of an electromagnetic eddy-current slip clutch 15, having an eddy-current drum 6 and an A. C. field coil indicated at CL. The coil CL is carried upon a toothed rotor 8 keyed to shaft 9. This coil is connected across slip rings 17 over which current is brought to energize the coil to effect a slipping magnetic coupling.

Motor-driven clutch apparatus of the above form is particularized more fully in the United States Patent 2,286,777 of Martin P. Winther et al., dated June 16, 1942, for Speed control unit.

Figure 2:
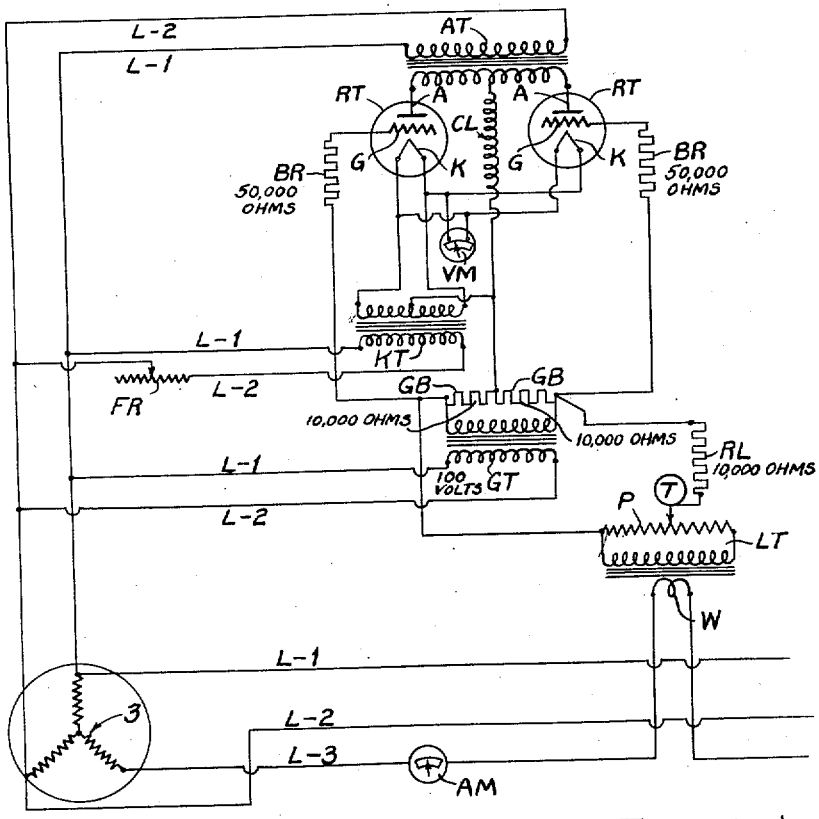
Fig. 2 is a wiring diagram of a torque-control circuit for Fig. 1.

Referring now more particularly to Fig. 2, there is shown at L—1, L—2, L—3 a three-phase, A. C. circuit which supplies the A. C. motor 3. At CL is the slip clutch winding which provides a D. C. clutch load, upon clutch magnetization. The direct current for this load is supplied through a pair of three-element, hot-cathode, gas-filled rectifier tubes RT of the half-wave type.

At AT is an anode transformer which supplies power for the D. C. clutch load, this transformer AT being connected on its primary side across line wires L—1 and L—2 of the A. C. supply circuit. Anodes A of the tubes RT are shown connected to the opposite ends of the secondary of the anode transformer AT.

Tube cathodes or heaters K are energized by a filament transformer KT, the primary of which transformer is also energized from line wires L—1 and L—2. The filament transformer KT is regulated by means of a filament rheostat FR.

The grids of the tubes RT are shown at G. Resistors BR are grid current-limiting resistors, whereby the grid currents are held to a low value of two or three micro amperes at the maximum. A suitable value for these resistors BR is 50,000 ohms.

The opposite ends of the secondary of the transformer KT are respectively connected across the cathodes K of the rectifier tubes RT.

The secondaries of the anode transformer AT and of the cathode transformer KT are connected together at their center taps, as shown, through the clutch coil CL which provides the D. C. load. Thus the D. C. load through the clutch coil CL may flow, when permitted, between the center taps of transformer AT and transformer KT and through the rectifier tubes RT alternately as the respective tubes RT are alternately fired or released by the grids G to pass current in a manner to appear.

At GT is shown a grid transformer which supplies practically no current to the system, but operates primarily to place alternating potentials upon the grids G to cause alternate firing or current release through the tubes RT. This transformer GT has its primary also connected across the supply lines L—1 and L—2, as shown. The voltage of the secondary of the grid transformer GT is approximately 100 volts, but this may be adjusted in accordance with requirements of the circuit. Resistors GB, for example, of 10,000 ohms each, and themselves in series, are connected across the secondary of the transformer GT. They hold the current in the secondary to a low value. The result is that the potentials in opposite ends of the two resistors GB are applied to the grids G through the resistances BR. A center tap between the resistances GB is connected to the center tap of the filament transformer KT so as to form a basis for a grid-to-cathode potential relationship.

In the motor lead L—3 are placed one or two turns of wire W, used as a primary for current transformer LT which is a series primary transformer, with a higher voltage secondary, as indicated. Across this secondary is placed an adjustable potentiometer P which can be graduated or set by an operator. This setting may be made in view of the reading of an ammeter AM which is placed in the motors lead L—3, so that the operator can at all times ascertain how much current and/or torque to which the motor 3 is being limited.

A resistance RL of 10,000 ohms is inserted in the potentiometer circuit and across the secondary of transformer GT so that transformer LT cannot short circuit the secondary of the transformer GT.

It will be noted that the grid transformer GT sets up a potential which is based upon a composite wave from legs L—1 and L—2. Since inherently the electrical wave in leg L—3 of the motor circuit is always 180° out of phase with the corresponding composite waves in legs L—1 and L—2, the potential set up by the transformer LT is always 180° out of phase with the potential set up by the transformer GT, that is, it is opposing. The potential of transformer GT will cause the grids G to fire or release tubes RT for current passage, alternately as each grid G becomes positive, and to shut off the respective tube when its grid G becomes negative.

The potential from transformer LT is applied at some value, according to the setting of the potentiometer P, so that the potential of transformer LT will exactly neutralize first one and then the other of the potentials on resistors GB. Since the potential supplied by transformer LT is proportional to the current flowing in the legs of the motor circuit (particularly leg L—3), the potential delivered by it cannot rise to the necessary value required to neutralize the potentials at the ends of resistances GB, unless the current flowing through leg L—3, and hence to the motor itself, is high enough that it generates such neutralizing potential. Therefore it can be seen that, as long as the current of the A. C. motor is lower in value than that which is necessary to generate a neutralizing value across resistances GB, the grids G of the rectifier tubes RT will continue to fire and apply full D. C. excitation to the clutch winding CL. This will continue until such time as the current does rise in the motor to a value which can set up in the potentiometer P a neutralizing potential against the secondary of the transformer GT. Thus the grids G will continue to fire the tubes and energize CL until the potential difference supplied by transformers LT and GT is of a definite value. And the grids G will continue to fire the tubes at the same rate regardless of an incipient approach to the neutralizing value, that is, until substantially the exact value is arrived at. Therefore, the ammeter AM, to a high degree of accuracy, indicates the value of torque (according to some constant) at which cut off of energization to CL will occur.

It will be clear from the above that the rectifying tubes RT will not fire, and thus not feed direct current into the clutch coil unless activated to fire by potentiation from the grid transformer GT. When the potential from the grid transformer GT is neutralized from the potentiometer rheostat P, the tubes RT do not fire, and since the potentiometer P may be controlled it will be seen that the firing of the tubes may be cut off at any desired current value in the line L—3.

Also, the adjustment of the potentiometer rheostat P need not be left stationary as acceleration of the load on shaft 9 proceeds. For example, the torque may be steadily increased or decreased as a function of time, and a suitable timing device T could be used for the purpose.

It should be borne in mind that the current input of the A. C. motor 3 is a function of the torque supplied by the motor, according to a definite relation. In the ordinary running range of the motor, wherein the motor is not loaded too far, this is a nearly direct proportion, and the ammeter reading is therefore nearly a direct torque reading, according to some constant multiplier, to a sufficient degree of accuracy. If the motor is overloaded outside of its ordinary running range, the ammeter may be especially recalibrated in torque units.

Generalizing, the invention consists in controlling the amount of A. C. motor torque delivered to a load by employing between the motor and its work load an electromagnetic eddy-current clutch, the field of which is energized by direct current from rectifiers. The rectifiers are operated to fire, and energize the clutch field, by rectifying from one portion of the motor supply circuit. An out-of-phase regulating voltage from another portion of the motor circuit is impressed upon the grids of these rectifiers alternately and definitely to stop their firing, and thus to stop clutch field energization, when the current value in the motor A. C. supply circuit rises to a desired point. The load referred to in the appended claims is the work load on shaft 9 and which is supplied by motor torque. The load for energizing coil CL is not supplied by the motor but directly from circuit L—1, L—2, L—3.

Tests made show, for example, that if the normal current at full load torque of the motor is 100 amperes and the motor is started while the potentiometer P is adjusted until the ammeter shows 100 amperes, the motor will continue to draw not over 100 amperes. Furthermore, it will draw very little under that value continuously until the motor is fully accelerated. This means in the case of a centrifuge, for example, that the motor will continuously apply torque to the maximum predetermined allowable value, which means that the load will be accelerated in the least possible time consistent with the desired motor loading. Time of acceleration may be controlled by adjusting P.

Figure 3:
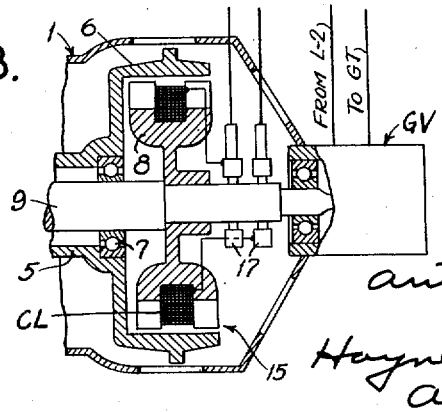
Fig. 3 is a fragmentary view similar to Fig. 1, but showing an alternative form.

As indicated in said patent above mentioned, a speed-responsive governor may be used in connection with the driven element of the clutch 15. For example it may be driven by the shaft 9. Fig. 3 shows such a governor on shaft 9. Its function is to control contacts or a carbon pile or the like to open upon increase in speed and vice versa.

Figure 4:
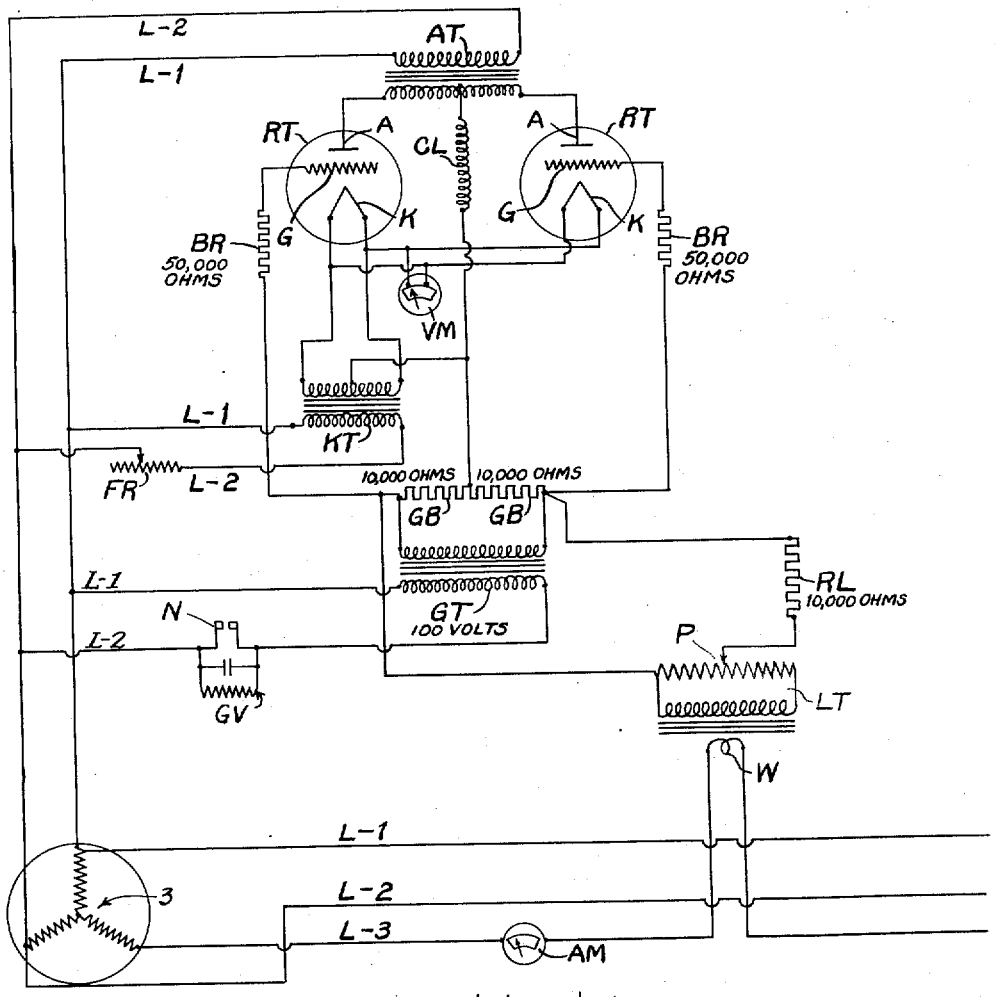
Fig. 4 is a wiring diagram similar to Fig. 2, but showing an alternative circuit arrangement applicable to Fig. 3; and, Fig. 5 is a wiring diagram of an alternative circuit for carrying out the invention.

If it is desired to use a speed control in connection with the present apparatus, the contact circuit of the governor is connected in one of the lead lines to the transformer GT, as shown in Fig. 4. In this Fig. 4, the governor is shown at GV, consisting of a resistance in parallel with a suitable condenser. This resistance is also in parallel with contacts diagrammatically shown at N which respond by opening to overspeeding of the shaft 9. Thus the governor simply reduces current in, and causes the potential available out of the transformer GT, to be cut off when the clutch shaft 9 tends to overspeed, and to be re-established when the clutch shaft 9 tends to run under the desired speed. The remainder of the circuit which functions for torque limitation is still used in the way above described in connection with Figs. 1 and 2 to set a point beyond which the torque of the motor cannot rise. The duty of the governor is very low in watts, inasmuch as the only wattage required is the very small amount required to flow in the resistors GB.

It may be seen that, although the rectifying tubes RT are each half-wave tubes, if taken together they constitute a full-wave rectifying means.

It will be noted that the rectifier tubes RT are connected in parallel to feed current into the clutch coil. A voltmeter VM may be used to determine voltage conditions in the cathode circuit.

Figure 5:
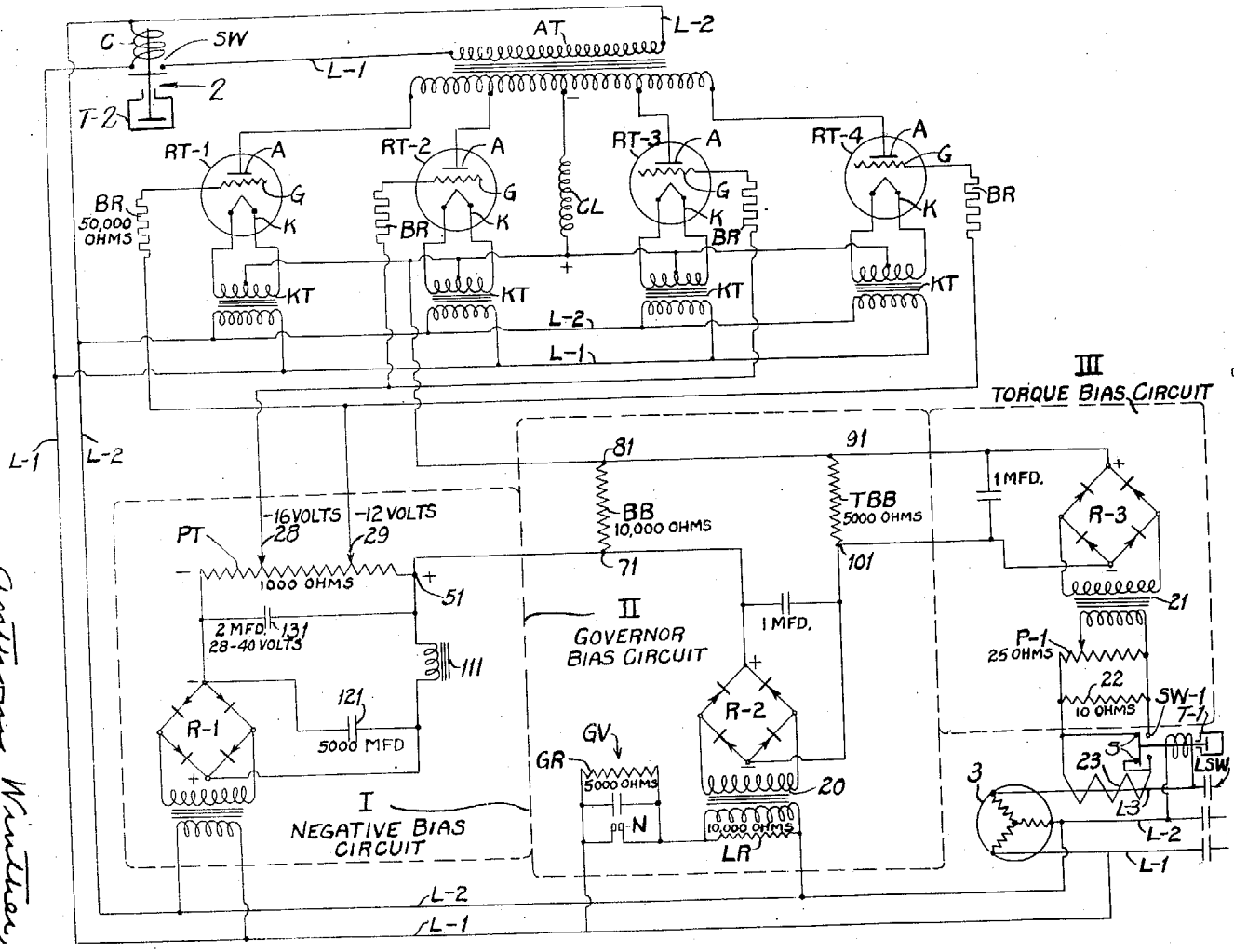

Fig. 5 illustrates an electronic circuit similar to the one described, but employing direct current instead of alternating current in the control components, and also employing four tubes RT—1, RT—2, RT—3 and RT—4 firing into the coil CL. The two outer tubes RT—1 and RT—4 have a higher anode voltage than the two inner tubes and ordinarily take the load, as will appear.

In Fig. 5, L—1, L—2, L—3 again is the three-phase supply circuit for the motor 3, and lines L—1 and L—2 supply the transformer AT. The four tubes RT—1, RT—2, RT—3 and RT—4 are connected to the secondary of the transformer AT, as shown, equidistantly by pairs on opposite sides of the center tap connection for the coil CL. The other side of the coil CL is connected to the mid taps of the transformers KT which are also energized from the lines L—1 and L—2 as before. The cathodes or heaters are again indicated at K. The grids are indicated at G. The resistances BR are indicated in connection with the respective grids G. The anodes of the tubes are identified as A. Thus it will be seen that the primary change in the principal tube circuit is the provision of four tubes, two of which ordinarily take the load. The more fundamental change is in the provision of direct current in the control circuit, instead of alternating current as in Figs. 1–4. Three basic control circuits are used, and are indicated in dotted boxes identified generally by numerals I, II and III.

The reason for using D. C. control circuits is to eliminate, in certain instances, design difficulties in regard to phasing, arising from the possible effect of power factor, or incorrect connections which might easily be made. For example, it is possible to obtain transients when a governor is used, which might confuse an erector in properly phasing the circuit. Thus the following description refers to the same general torque control circuit and governor circuit as already illustrated in Fig. 4, broadly speaking, but use is made of direct current for the various control functions, instead of alternating currents.

The control circuit I may be referred to as the circuit for basic negative bias, or negative bias circuit. The control circuit II may be referred to as the governor bias circuit. The control circuit III may be referred to as the torque bias circuit.

Basic negative bias is adjusted by means of the potentiometer PT, so that the two outer tubes RT—1 and RT—4 have a less negative bias than the two inner tubes RT—2 and RT—3. Thus the outer tubes always function unless one of them fails. This results in a basic control causing the two outer tubes always to function, regardless of any transients that might otherwise cause the two inner tubes to function when not wanted. Therefore, the normal continual function of the two outer tubes RT—1 and RT—4 is assured not only by the higher anode voltage but by a less quantity of negative bias on the grids.

Tracing through circuit I, the direct current from the rectifier R—1 is passed through a filter circuit containing condensers 121 and 131 with a choke 111 interposed between connections of the condensers in the conventional manner. Potentiometer resistor PT causes a steady load of a very small magnitude on rectifier R—1.

From the resistance PT, at point 29, a negative voltage of the value minus twelve (—12), for example, is taken off and imposed on the grids of the outer tubes RT—1 and RT—4. At the point 28 a larger negative voltage value, of minus sixteen (—16), is taken off and imposed on the grids of the two inner tubes RT—2 and RT—3. Normally, the negative bias described and established by negative-bias circuit I will prevent the tubes from firing so that no direct current will be supplied to the clutch CL.

The rectifier R—2 in the governor-bias circuit II is arranged so that direct current is produced only when the contacts N in governor GV close, or in any event a very small amount may be supplied by resistor GR, which is insufficient appreciably to affect the circuit because GR is of a high value. Resistor LR is preferably placed across the primary of transformer 20 so as to control load on the governor contact points to permit them to pass current and keep themselves clean. The positive output of governor rectifier R—2 is connected to the positive output of the circuit I at point 71. The negative side is connected (via resistance TBB) to the top of a bias blocking resistor BB in such a manner as to place a negative charge on a point 81 of this resistor BB when the governor contacts close.

Assume that the governor contacts are open and no current flows in rectifier R—2. Rectifier R—1 supplies a steady D. C. potential. Therefore, all metallic conductors and elements connected to point 51 in circuit I will have a positive value, and because there is no appreciable current flow, due to the high value of the blocking resistors BR in the grids of the tubes, a substantially uniform positive condition will occur in all such metallic conductors or elements. Hence, the cathodes K in the tubes will have a certain positive value while the grids in each tube, being connected to points 28 and 29 on potentiometer PT will all have a normal and steady negative value, thus preventing the tubes from firing.

Now assume that the governor contacts close in circuit II. A negative potential, or a drawing-away of current, will occur through resistor TBB, point 91, and point 81. Hence the closing of governor points will cause a subtraction of positive at point 81. Hence, the difference of potential between cathodes K and the grids will intermittently be reduced so that the tubes can fire. The resistor BB is necessarily made rather high in value, as shown, which is 10,000 ohms, so that this potential cannot instantaneously rectify itself, or balance out. Therefore, it can be seen that the closing of the governor points causes the tubes to fire. The characteristic of these tubes is, as before, to fire as long as the anode potential remains in the positive area of the cycle or sine wave under consideration.

Regarding torque bias circuit III, it is supplied from transformer 23. The primary of another transformer 21 provides inductive load for the current transformer 23. Transformer 21 supplies the rectifier R—3. A resistor 22 establishes a uniform load on the output of the current transformer 21 so that at no time, regardless of the adjustment of potentiometer P—1, can there be a condition when the output is not loaded.

Potentiometer P—1 may be adjusted to place a certain needed potential for the damping-out or stopping of the firing of the tubes in response to the value of the current in amperes in line L—3. It will be noted that the positive terminal of rectifier R—3 connects to point 81 via point 91. In this case the source of the positive in rectifier R—3 has the function of re-establishing positive on point 81. Resistor TBB in this case provides a load for rectifier R—3. It also establishes and helps maintain a relatively high positive at point 91, because of its value. It should also be noted that resistor TBB is half the value of resistor BB. The reason is that resistor TBB must permit enough negative effect through points 101, 91, and to 81 via 71, so as to permit the governor to function, but the resistor TBB also functions to permit the passage of positive from rectifier R—3 to point 81 via point 91, despite the load across TBB on rectifier R—3. Therefore, when the current in supply line L—3 rises to such a value as will cause a positive voltage from rectifier R—3 to re-establish the "no fire" potential value on point 81, then regardless of the opening and the closing of the governor the tubes will not fire. Thus the governor speed control is overriden by the torque-bias control. In this manner, the torque control circuit III can prevent operation of the tubes when the desired current into the motor is exceeded by overloading.

Not only does the torque control circuit III provide means for limiting the torque the motor can exert, but provides a safety feature, so that the motor 3 cannot be stalled, due perhaps to some condition where the governor, for example, has been set at some high speed condition and carelessly left there by the operator who may possibly turn on all circuits at once without assuring himself that the governor has been turned to zero position.

In the case of large motors coupled with eddy-current clutches, the inertias of the motor rotor and the clutch elements may be high. Thus applying full excitation, as would occur if the governor were at rest and set for some high output speed, would cause the motor 3 to stall because it could not develop enough torque to accelerate the masses as quickly as the eddy-current clutch coupling would require. The torque control circuit III is a means for guarding against such a stalling condition.

As a further protection, a time delay relay 2 may be inserted in the line which supplies AT, so that contacts SW thereof are caused to remain open until closure time delay element T—2 ic actuated by coil C. This relay delays the time at which the anode voltages are applied, even though all the cathode transformers have been previously energized directly from lines L—1, L—2. Thus the transformers KT are energized, and one minute later the time delay switch SW closes.

Also, another contact SW—1 may be inserted in one leg of current transformer 23 to protect against the high inrush into motor 3 when the line switch LSW is closed to the motor. It is commonly known that induction motors take as high as seven times the normal full load current when they are connected across the line. Such a condition might possibly burn out rectifier R—3 because of heavy over-normal voltages applied to it. Therefore, contact SW—1 is placed in the circuit of transformer 23 and closes one minute after contacts LSW in the supply circuit, so that no injury will be done to the rectifier R—3. Contact SW—1 preferably closes at the same time as SW, for example, by regulating the time delay elements T—1 and T—2 respectively. Also, short-circuit contacts S on switch SW—1 short-circuit the secondary of the current transformer 23 when the switch SW—1 is open. When the contacts SW—1 close the short-circuit is opened.

It will be understood that the time-delay contacts and operating parts SW— and SW—1 are shown only diagrammatically, being known devices per se.

Additional advantages of the D. C. circuits described in Fig. 5 are that no phasing of transformer III is necessary, nor is phasing of any other portion of the circuit necessary. It is also found that the vacuum tubes are more stable when direct current is used. Rectifiying vacuum tubes may be used in place of rectifiers R—1, R—2 or R—3.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Torque control apparatus for a motor energized from an A. C. circuit comprising an eddy-current clutch between the motor and a load, a D. C. field coil in said clutch, A. C. rectifier means feeding said D. C. field coil, potential means responsive to one portion of said A. C. circuit for actuating the rectifying means to rectify, and a second potential means responsive to current in said A. C. circuit and connected in opposition to said first-named potential means for neutralization against rectification at predetermined current values in said A. C. circuit, whereby the clutch coil is energized only up to current of predetermined value in said A. C. circuit.

2. Torque control apparatus for a motor energized from an A. C. circuit, comprising an eddy-current clutch between the motor and the load, a D. C. field coil in said clutch, rectifying means connected to said coil and energized from said A. C. circuit, potential control means for said rectifying means operative from one part of said A. C. circuit, a second potential means operative in response to current flow in another part of said A. C. circuit for neutralizing at predetermined current values the first-named potential, whereby at said currents of predetermined values rectification and the delivery of current to said coil is stopped, and variable potentiometer control means adapted to effect neutralization of relatively more potential in response to less current, and vice-versa.

3. Torque control apparatus for an A. C. motor energized from an A. C. circuit, comprising an eddy-current clutch between the motor and a load, a D. C. field coil in said clutch, rectifying means adapted to feed direct current to said clutch winding, means for supplying energy to said rectifying means and the clutch coil from one part of the A. C. circuit which serves said motor, means energized from said section of the motor circuit above mentioned for placing a grid potential upon the rectifying means to control current flow therethrough, and means responsive to another part of the A. C. motor circuit and in opposite phase with respect to said grid potential, whereby current flow through the rectifying means is blocked when the current in the A. C. circuit exceeds a predetermined value.

4. Torque control apparatus for an A. C. motor fed from a three phase circuit comprising an eddy-current clutch, a field coil for energizing the clutch, a pair of three-element vacuum tube rectifiers connected to feed direct current in parallel into the field coil, means energized from the three phase circuit to feed alternating current to said tubes, means responsive to alternating current from one portion of the motor circuit adapted to apply biasing potentials alternately to the grids of the tubes to alternate flow of rectified current from the respective tubes to said field coil, and means responsive to current in another part of said A. C. motor circuit adapted to apply in opposite phase a potential against said biasing potential to prevent flow from both tubes in response to excessive current in the A. C. circuit.

5. Torque control means for an A. C. motor in a three phase A. C. circuit comprising an eddy-current clutch between the motor and the load, a field coil in the clutch, a pair of vacuum rectifier tubes connected to feed in parallel to the field coil, each of said tubes having an anode, a cathode, and a grid, anode and cathode transformers respectively connected to the anodes and cathodes and energized from said motor circuit, a grid-bias transformer connected to apply alternately to said grid potentials to fire the tubes in circuit with the clutch coil, said grid-bias transformer means being connected to one portion of said three phase circuit, and a fourth transformer responsive to current in another portion of said three phase circuit which is opposite in phase to the supply for the grid-bias transformer and connected in potential opposition to said grid-bias transformer.

6. Torque control means for an A. C. motor in a three phase A. C. circuit comprising an eddy-current clutch between the motor and the load, a field coil in the clutch, a pair of vacuum rectifier tubes connected to feed in parallel to the field coil, each of said tubes having an anode, a cathode, and a grid; anode and cathode transformers respectively connected to the anodes and cathodes and energized from said motor circuit, a grid-bias transformer connected to apply alternately to said grid potentials to fire the tubes in circuit with the clutch coil, said grid-bias transformer means being connected to one portion of said three phase circuit, a fourth transformer responsive to current in another portion of said three phase circuit which is opposite in phase to the supply for the grid-bias transformer and connected in potential opposition to said grid-bias transformer, and potentiometer means for adjusting the potential delivered by said last-named transformer, whereby more or less motor current can be made to correspond to firing of the tubes, as desired.

7. Torque control apparatus for a motor energized from an A. C. circuit, comprising an eddy-current clutch between the motor and a load, a D. C. field coil in said clutch, a pair of half-wave rectifying tubes feeding in parallel into said coil, each tube having an anode, a cathode and a grid, an anode transformer having a secondary connected to the anodes, a cathode transformer having a secondary connected to the cathodes, said transformers having primaries connected to said A. C. circuit, a grid transformer having a primary connected to one part of said A. C. circuit and a secondary connected to said grids and to said cathode transformer, to effect alternating potential on said tubes for alternately causing current to flow into the clutch coil, a current transformer having a primary connected to another part of said A. C. circuit and having a secondary connected with said grid transformer in potential opposition, potentiometer means across the last-named secondary for controlling the potential opposition, whereby predetermined current in the motor will cause predetermined neutralization of potential on said grids, so that motor current and torque are automatically limited by the resulting slipping in said clutch when current from said tubes stops, and speed responsive means in the primary of said grid transformer responsive to the speed of the load side of said clutch to deenergize the grid transformer and consequently at excessive speeds causing said tubes to stop their current output.

8. Torque control apparatus for a motor energized from an A. C. circuit, comprising an eddy-current clutch between the motor and its load, a D. C. field coil in said clutch, means feeding said D. C. field coil and having a control responsive to potential, D. C. potential means responsive to one portion of said A. C. circuit and including a rectifier for controlling said feeding means, and a second D. C. governor-controlled potential means including a second rectifier responsive to said A. C. circuit and connected to affect said first-named potential and adapted to superimpose governor control on the feeding means.

9. Torque control apparatus for a motor energized from an A. C. circuit, comprising an eddy-current clutch between the motor and its load, a D. C. field coil in said clutch, means feeding said D. C. field coil and having a control responsive to potential, D. C. potential means responsive to one portion of said A. C. circuit and including a rectifier for controlling said feeding means, a second D. C. governor-controlled potential means including a second rectifier responsive to said A. C. circuit and connected to affect said first-named potential and adapted to superimpose governor control on the feeding means, and a third potential means responsive to excessive values of current in said A. C. circuit to override governor control and to affect said first-named potential.

10. Torque control apparatus for a motor energized from an A. C. circuit comprising an eddy-current clutch between the motor and a load, a D. C. field coil in said clutch, rectifier tubes connected to said coil and energized from said A. C. circuit, means for maintaining a negative bias on said tubes comprising a D. C. negative-bias circuit connected with the grids of said tubes, a rectifier, and means for feeding current from said A. C. circuit to said D. C. biasing circuit through said last-named rectifier, said bias tending to prevent the tubes from energizing said field coil, a governor driven by the clutch, a governor circuit energized from said A. C. circuit, a rectifier in said governor circuit, a D. C. portion in said governor circuit and fed from its rectifier, said governor upon overspeeding opening its contacts to deenergize said governor circuit whereby the biasing means is unaffected and does not cause said tubes to energize said field coil, but when said governor contacts close upon underspeeding the governor circuit is energized to affect said biasing means to cause the tubes to energize said coil.

11. Torque control apparatus for a motor energized from an A. C. circuit comprising an eddy-current clutch between the motor and a load, a D. C. field coil in said clutch, rectifier tubes connected to said coil and energized from said A. C. circuit, means for maintaining a negative bias on said tubes comprising a D. C. negative-bias circuit connected with the grids of said tubes, a rectifier, and means for feeding current from said A. C. circuit to said D. C. biasing circuit through said last-named rectifier, said bias tending to prevent the tubes from energizing said field coil, a governor driven by the clutch, a governor circuit energized from said A. C. circuit, a rectifier in said governor circuit, a D. C. portion in said governor circuit and fed from its rectifier, said governor upon overspeeding opening its contacts to deenergize said governor circuit whereby the biasing means is unaffected to cause said tubes to energize said field coil, but when said governor contacts close upon underspeeding the governor circuit is energized to affect said biasing means to cause the tubes to energize said coil, and a D. C. torque-bias circuit energized from the A. C. circuit through a rectifier and connected to override the control by the said bias circuits to cause the rectifier tubes to feed the field coil only when predeterminately low curents flow in said A. C. circuit.

12. Torque control apparatus for a motor energized from an A. C. circuit comprising an eddy-current clutch between the motor and a load, a D. C. field coil in said clutch, at least four rectifier tubes feeding said field coil, a biasing circuit connected to the grids of said tubes for bias tube control, said biasing circuit being connected to said A. C. circuit and comprising a rectifier, a potentiometer connected with said rectifier, a connection with the potentiometer arranged at one series of potentials and controlling two of said tubes and a second connection connected with said potentiometer arranged at another series of potentials and controlling the other two tubes, a governing biasing circuit comprising a governor electrically connected with said A. C. circuit, and a rectifier fed thereby, said governor biasing circuit having a D. C. portion connected with said first-named biasing circuit to apply an additional bias tube control.

13. Torque control apparatus for a motor energized from an A. C. circuit comprising an eddy-current clutch between the motor and a load, a D. C. field coil in said clutch, at least four rectifier tubes feeding said field coil, grids in the tubes, a biasing circuit connected to the grids of said tubes for bias control, said biasing circuit being connected to said A. C. circuit and comprising a rectifier, a potentiometer connected with said rectifier, a connection at one potential with the potentiometer and controlling two of said tubes and a second connection connected with said potentiometer and controlling the other two tubes at a different degree, a governing biasing circuit comprising a governor electrically connected with said A. C. circuit, a rectifier fed thereby, said governor biasing circuit having a D. C. portion connected with said first-named biasing circuit, and a torque-biasing circuit comprising an A. C. section energizing from said A. C. circuit, a rectifier in said torque-biasing circuit, and a D. C. portion in said torque-biasing circuit fed by its rectifier and connected with both of said previously mentioned biasing circuits, the torque-biasing circuit being responsive to rise in current in the A. C. circuit to maintain a condition of potential on the grids to prevent tube firing regardless of the action of the governor circuit.

14. Torque control apparatus for a motor energized from an A. C. circuit, comprising an eddy-current clutch between the motor and the load, a D. C. field coil in said clutch, rectifier tubes energized from the A. C. circuit energizing said field coil with direct current, control grids in said tubes, a potentiometer connected with said grids; a negative-bias circuit feeding said potentiometer, said negative bias circuit being energized from the A. C. circuit and including a rectifier, negative bias from said negative bias circuit normally being such as to prevent the tubes from energizing the coil; a governor-bias circuit having a contact governor therein responsive to the driven member of the clutch to open and close its contacts, said governor-bias circuit also being energized from the A. C. circuit and including a rectifier, said governor-bias circuit being so connected to the rectifier in the negative-bias circuit that when the governor points are open the bias on said grids remains such as to prevent the tubes from energizing the coil, but when the governor contacts are closed, the coil will be energized; a torque-bias circuit also energized from said A. C. circuit and including a rectifier, said torque-bias circuit being connected with the said two bias circuits so that upon undue rise of current in the A. C. circuit supplying the motor, said rectifier tubes will be prevented from energizing the coil regardless of the open or closed condition of said governor points.

15. Torque control apparatus for a motor energized from an A. C. circuit, comprising an eddy-current clutch between the motor and the load, a D. C. field coil in said clutch, rectifier tubes energized from the A. C. circuit energizing said field coil with direct current, control grids in said tubes, a potentiometer connected with said grids; a negative bias circuit connecting with said potentiometer, said negative bias circuit being energized from the A. C. circuit and including a rectifier, said potentiometer providing less negative bias for some of said tubes than others, the negative bias from said negative bias circuit normally being such as to prevent any of the tubes from energizing the coil.

16. Torque control apparatus for a motor energized from an A. C. circuit, comprising an eddy-current clutch between the motor and the load, a D. C. field coil in said clutch, rectifier tubes energized from the A. C. circuit energizing said field coil with direct current, control grids in said tubes, a potentiometer connected with said grids; a negative bias circuit connecting with said potentiometer, said negative bias circuit being energized from the A. C. circuit and including a rectifier, said potentiometer providing less negative bias for some of said tubes than others, the negative bias from said negative bias circuit normally being such as to prevent any of the tubes from energizing the coil; a governor-bias circuit having a contact governor therein responsive to the driven member of the clutch to open and close its contacts, said governor-bias circuit also being energized from the A. C. circuit and including a rectifier, said governor-bias circuit being so connected to the negative bias circuit that when the governor points are open the bias on said grids remains such as to prevent the tubes from energizing the coil, but when the governor contacts are closed, the coil will be energized; a torque bias circuit also energized from said A. C. circuit and including a rectifier, said torque bias circuit being connected with the said two bias circuits so that upon undue rise of current in the A. C. circuit supplying the motor, said rectifier tubes will be prevented from energizing the coil regardless of the open or closed condition of said governor points.

17. In apparatus of the class described, a motor energized from an A. C. circuit, an eddy-current clutch having a driving member connected to the motor and having a driven member connected to the load, a D. C. field coil in said clutch, a rectifying tube feeding from said circuit into said coil, said tube having a grid, a grid circuit connecting the A. C. circuit with the grid characaterized by having a low wattage, and centrifugally operated speed responsive means in the low-wattage grid circuit responsive centrifugally to the speed exclusively of the driven member of said clutch, to make and break said grid circuit so that excessive speeds cause said tube to stop its current output.

18. In apparatus of the class described, a motor energized from an A. C. circuit, an eddy-current clutch having a driving member connected to the motor and having a driven member connected to the load, a D. C. field coil in said clutch, a rectifying tube feeding into said coil, said tube having an anode, a cathode and a grid, a low-wattage grid circuit, an anode transformer fed from the A. C. circuit and having a secondary connected to the anode, a grid transformer having a primary connected to one part of said A. C. circuit and a secondary connected to said grid circuit and to said cathode, and centrifugally operated speed responsive means in the primary of said grid transformer responsive centrifugally to increased speed exclusively of the driven member of said clutch to deenergize the grid transformer, excessive speeds causing said tube to stop its current output and vice versa.

19. In apparatus of the class described, a motor energized from an A. C. circuit, an eddy-current clutch between the motor and the load, a D. C. field coil in said clutch, at least one rectifying tube feeding into said coil, said tube having an anode, a cathode and a grid, a low-wattage circuit for the grid, an anode transformer having a secondary connected to the anode, a grid transformer having a primary connected to one part of said A. C. circuit and a secondary connected to said grid circuit and to said cathode, a current transformer having a primary connected to another part of said A. C. circuit and having a secondary connected to said grid transformer in potential opposition, and speed responsive means in the primary of said grid transformer responsive to the speed of the load side of said clutch to deenergize the grid transformer, excessive speeds causing said tube to stop its current output.

ANTHONY WINTHER.